(12) United States Patent
Ellenberger et al.

(10) Patent No.: US 12,229,504 B2
(45) Date of Patent: Feb. 18, 2025

(54) HYBRID BATCH AND LIVE NATURAL LANGUAGE PROCESSING

(71) Applicant: Solventum Intellectual Properties Company, Maplewood, MN (US)

(72) Inventors: Brian A. Ellenberger, Woodstock, GA (US); Thomas S. Polzin, Pittsburgh, PA (US); Rajasekharan Devarajan, Pittsburgh, PA (US)

(73) Assignee: Solventum Intellectual Properties Company, Maplewood, MN (US)

( * ) Notice: Subject to any disclaimer, the term of this patent is extended or adjusted under 35 U.S.C. 154(b) by 683 days.

(21) Appl. No.: 17/053,224

(22) PCT Filed: May 7, 2019

(86) PCT No.: PCT/US2019/031018
§ 371 (c)(1),
(2) Date: Nov. 5, 2020

(87) PCT Pub. No.: WO2019/217355
PCT Pub. Date: Nov. 14, 2019

(65) Prior Publication Data
US 2021/0074271 A1   Mar. 11, 2021

Related U.S. Application Data

(60) Provisional application No. 62/668,330, filed on May 8, 2018.

(51) Int. Cl.
*G06F 40/35* (2020.01)
*G06F 40/20* (2020.01)
(Continued)

(52) U.S. Cl.
CPC ............ *G06F 40/20* (2020.01); *G10L 15/183* (2013.01); *G10L 15/22* (2013.01)

(58) Field of Classification Search
None
See application file for complete search history.

(56) References Cited

U.S. PATENT DOCUMENTS 8,694,305 B1   4/2014   Grove
11,783,422 B1 * 10/2023   Hayward ............. G08B 25/016
                                                                705/4

(Continued)

OTHER PUBLICATIONS

Gimpel, "Distributed asynchronous online learning for natural language processing", Association for computational linguistics, pp. 213-222.

(Continued)

*Primary Examiner* — Seong-Ah A Shin (57) ABSTRACT

A computer system performs live natural language processing (NLP) on data sources that are complex, remotely stored, and/or large, while satisfying restrictive time constraints. The computer system divides the NLP process into a batch NLP process and a live NLP process. The batch NLP process operates asynchronously over the relevant data set, which may be complex, remotely stored, and/or large, to summarize information into a summarized NLP data model. When the live NLP process is initiated, live NLP process receives as input the relevant information from the summarized NLP data model, possibly along with other data. The prior generation of the summarized NLP data model by the batch NLP process enables the live NLP process to perform NLP within time constraints that could not have been satisfied if the batch NLP process had not pre-processed the data set to produce the summarized NLP data model.

20 Claims, 4 Drawing Sheets

(51) Int. Cl.
*G10L 15/183* (2013.01)
*G10L 15/22* (2006.01)

(56) References Cited

U.S. PATENT DOCUMENTS

| | | |
|---|---|---|
| 2009/0271194 A1 | 10/2009 | Davis |
| 2013/0253908 A1 | 9/2013 | Zhai |
| 2014/0019128 A1 | 1/2014 | Riskin |
| 2014/0289188 A1 | 9/2014 | Shimanovsky |
| 2015/0356260 A1* | 12/2015 | D'Souza ................ G06Q 10/10 705/2 |
| 2016/0098386 A1* | 4/2016 | Rangarajan Sridhar .................... G06F 40/232 704/9 |
| 2016/0162456 A1* | 6/2016 | Munro ............. G06F 16/24532 704/9 |
| 2016/0314106 A1 | 10/2016 | Carrier |
| 2017/0256260 A1* | 9/2017 | Jeong ....................... G06F 3/16 |
| 2018/0053101 A1 | 2/2018 | Cudworth |
| 2018/0018562 A1 | 6/2018 | Jung |
| 2018/0336459 A1* | 11/2018 | Baughman ............. G06N 5/025 |
| 2020/0265316 A1* | 8/2020 | Das ........................ G06F 40/295 |
| 2020/0372219 A1* | 11/2020 | Relangi ................... G06F 40/35 |
| 2023/0153529 A1* | 5/2023 | Han ....................... G06F 40/284 704/9 |

OTHER PUBLICATIONS

International Search report for PCT International Application No. PCT/US2019/031018 mailed on Jul. 17, 2019, 2 pages.

European application 19799944 Supplementary European Search Report dated Dec. 16, 2021.

Pliennger, Andreas, "Deep Learning Neural Networks on Mobile Platforms", pp. 1-31, dated Jan. 18, 2016, Retrieved from the Internet on Jan. 31, 2018: URL:https://www.nst.ei.tum.de/fileadmin/w00bqs/www/publications/as/2015WS-HS-Deep_leanring mobile platforms.pdf.

* cited by examiner

HYBRID BATCH AND LIVE NATURAL LANGUAGE PROCESSING

CROSS REFERENCE TO RELATED APPLICATIONS

This application is a national stage filing under 35 U.S.C. 371 of PCT/US2019/031018 filed May 7, 2019, which claims the benefit of U.S. Provisional Application No. 62/668,300, filed May 8, 2018, the disclosure of which is incorporated by reference in

BACKGROUND

Live natural language processing (NLP) applications (i.e., those for which the actor is expecting an immediate or semi-immediate response) require short turnaround times in order to appear responsive and to be effective. The desired turnaround time (TaT) may depend on the application and scenario, but if a result is not returned quickly enough from the user's perspective, the effect may be the same from the user's perspective as if no result had been returned at all. For example, if a telephone application that creates an appointment based on voice input exceeds the amount of time required to create such an appointment manually (e.g., 3-5 seconds), most users will opt instead to create the appointment manually. If a live NLP application were to attempt to use data sources that are large, complex, and/or remote, then such applications would likely not be able to produce results quickly enough. As a result, live NLP applications typically use simple data sources that are readily available (e.g., stored locally).

There are, however, applications in which live NLP is desired but in which the data is complex and/or not readily available. Such data may, for example, be distributed among a variety of disparate sources located remotely from where the live NLP processing is performed. Furthermore, the amount of data may be infeasible to process within the desired time constraints, either due to current technical limitations or the economic viability of making available sufficient computing resources (e.g., CPU cycles, memory) to process within the time constraints.

SUMMARY

A computer system performs live natural language processing (NLP) on data sources that are complex, remotely stored, and/or large, while satisfying time constraints that were not previously possible to satisfy. The computer system divides the NLP process into a batch NLP process and a live NLP process. The batch NLP process operates asynchronously over the relevant data set, which may be complex, remotely stored, and/or large, to summarize information into a summarized NLP data model. When the live NLP process is initiated, live NLP process receives as input the relevant information from the summarized NLP data model, possibly along with other data. The prior generation of the summarized NLP data model by the batch NLP process enables the live NLP process to perform NLP within time constraints that could not have been satisfied if the batch NLP process had not pre-processed the data set to produce the summarized NLP data model.

One aspect of the present invention is directed to a method performed by at least one computer processor executing computer program instructions stored on at least one non-transitory computer readable medium to execute a method. The method includes: (A) receiving batch data asynchronously from a first data source; (B) performing NLP on the batch data to produce batch NLP data; (C) at a batch NLP module, generating a summarized NLP data model based on the batch NLP data in a first amount of time; (D) at a live NLP processor, after (B): (D)(1) receiving first live data from a live data source; (D)(2) combining at least a first part of the summarized NLP data model with the first live data to produce first combined data; and (D)(3) performing live NLP on the first combined data to produce first live NLP output in a second amount of time, wherein the second amount of time is shorter than the first amount of time.

Another aspect of the present invention is directed to a system including at least one non-transitory computer-readable medium having computer program instructions stored thereon, wherein the computer program instructions are executable by at least one computer processor to perform a method. The method includes: (A) receiving batch data asynchronously from a first data source; (B) performing NLP on the batch data to produce batch NLP data; (C) at a batch NLP module, generating a summarized NLP data model based on the batch NLP data in a first amount of time; (D) at a live NLP processor, after (B): (D)(1) receiving first live data from a live data source; (D)(2) combining at least a first part of the summarized NLP data model with the first live data to produce first combined data; and (D)(3) performing live NLP on the first combined data to produce first live NLP output in a second amount of time, wherein the second amount of time is shorter than the first amount of time.

Other features and advantages of various aspects and embodiments of the present invention will become apparent from the following description and from the claims.

DETAILED DESCRIPTION

Figure 1:
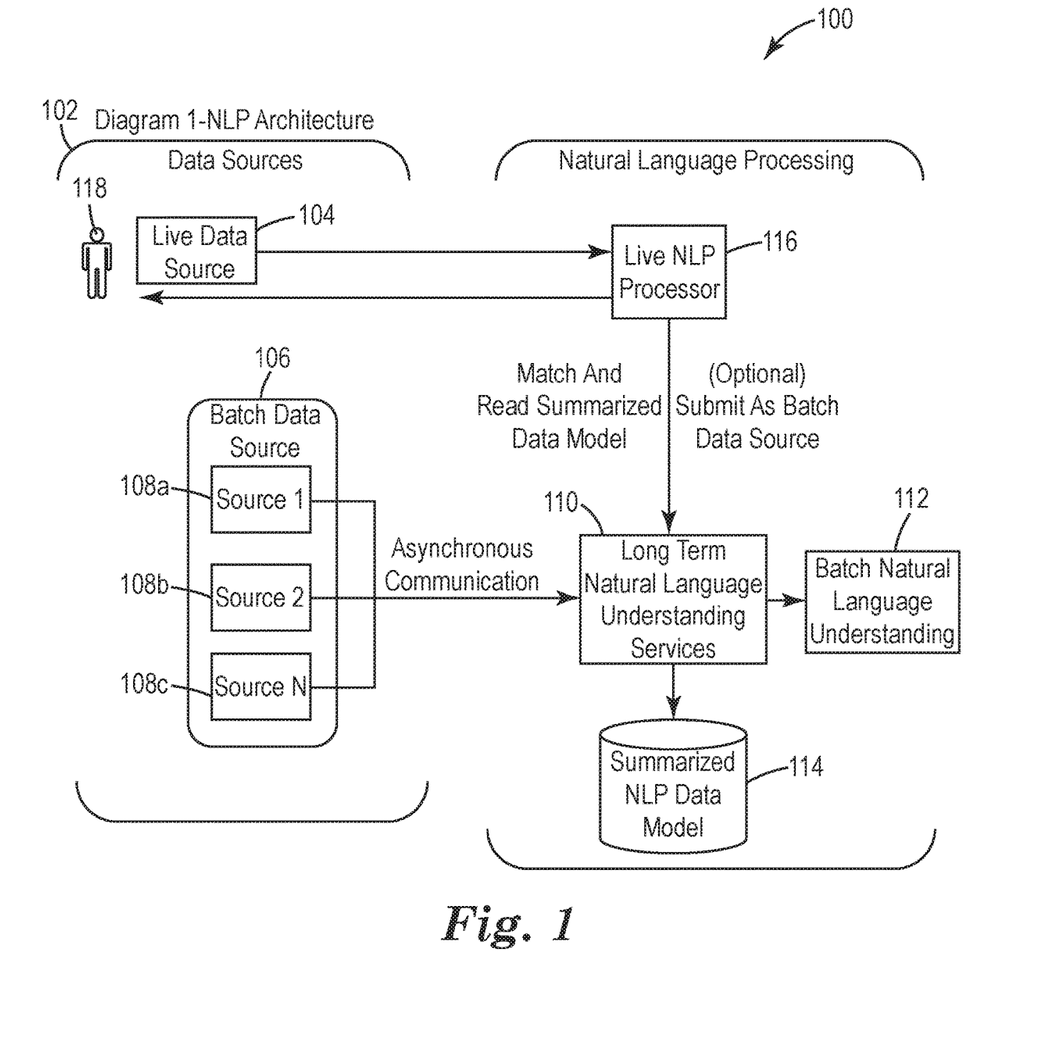
FIG. 1 is a dataflow diagram of a computer system for automatically performing live natural language processing (NLP) by dividing the NLP process into a batch NLP process and a live NLP process according to one embodiment of the present invention.
Figure 2A:
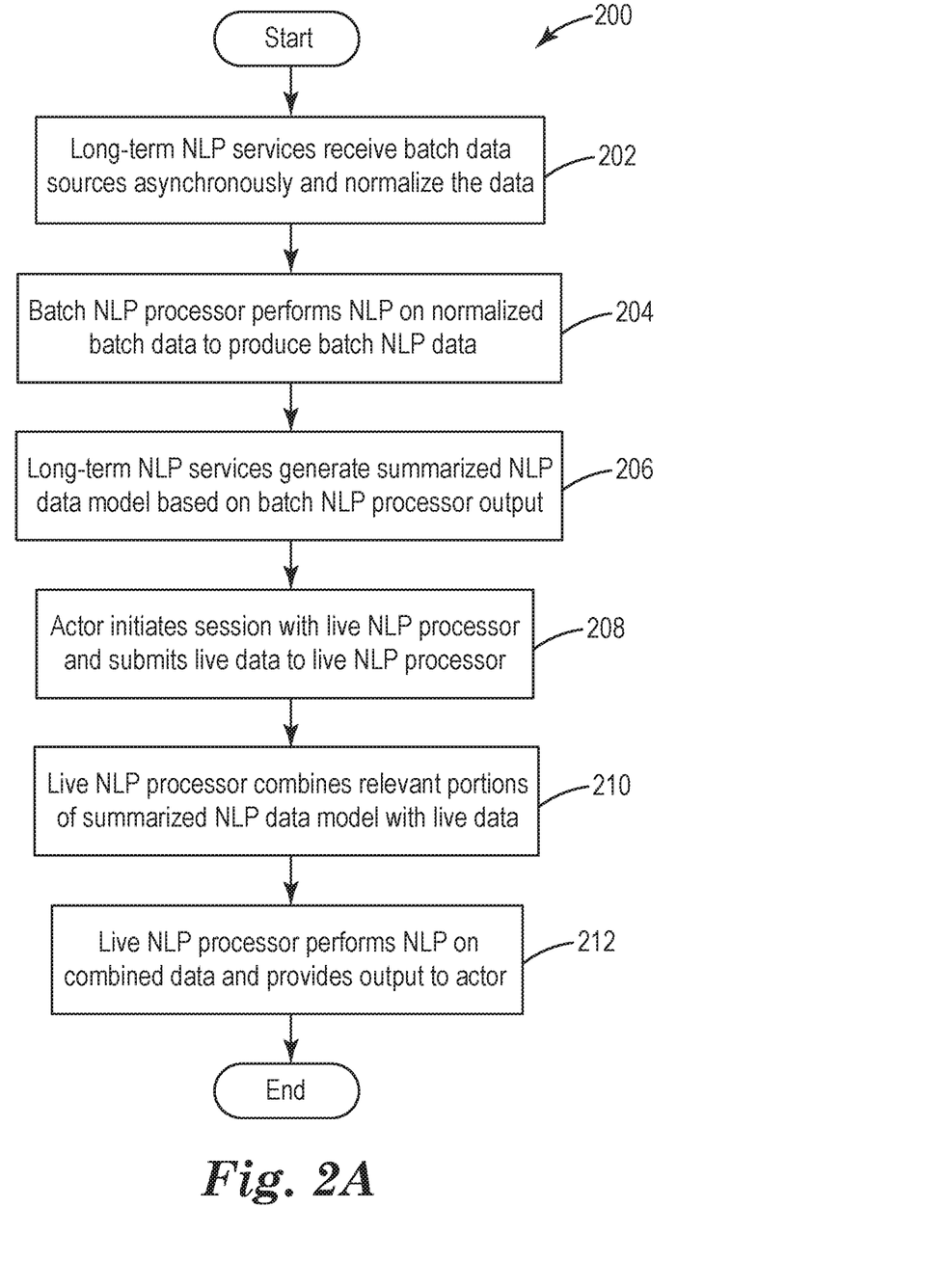
FIG. 2A is a flowchart of a method performed by the system of FIG. 1 according to one embodiment of the present invention.

In general, embodiments of the present invention are directed to a computer system that performs live natural language processing (NLP) on data sources that are complex, remotely stored, and/or large, while satisfying time constraints that were not previously possible to satisfy. For example, referring to FIG. 1, a dataflow diagram is shown of a system 100 for automatically performing live natural language processing (NLP) by dividing the NLP process into a batch NLP process and a live NLP process according to one embodiment of the present invention. Referring to FIG. 2A, a flowchart is shown of a method 200 that is performed by the system 100 according to one embodiment of the present invention.

The system 100 includes one or more data sources 102, such as a live data source 104 and a batch data source 104. Although only one live data source 104 is shown in FIG. 1 for purposes of example, this is merely an example and the system 100 may include any number of live data sources. In FIG. 1, the batch data source 106 is shown as including a plurality of batch data sources 108a-n, where n may be any number. The batch data sources 108a-n may, for example, include any one or more of the following types of data sources, in any combination: narrative data sources to which NLP is to be applied (as described below), non-narrative data sources (such as discrete data) which is to be used to supplement a summarized NLP data model 114 (as described below), and combinations of narrative and non-narrative data sources which are separated and processed into the summarized NLP data model 114 (as described below).

The system 100 includes one or more long-term NLP services 110. The long-term NLP services 110 receive some or all of the batch data sources 108a-n asynchronously and normalize the received data to produce normalized batch data (FIG. 2A, operation 202). Such normalization may be performed in any of a variety of ways, such as converting the received batch data from a plurality of data formats into a common data format in the normalized batch data.

The long-term NLP services 110 receive and process the batch data sources 108a-n asynchronously in the sense that the long-term NLP services 110 may receive and perform the functions disclosed herein over any period of time, which is referred to herein as the "processing time" of the long-term NLP services 110. The processing time of the long-term NLP services 110 is the difference between the time at which the long-term NLP services 110 begin to process any of the data in the batch data sources 108a-c and the time at which the long-term NLP services 110 produce the summarized NLP data model 114 as output.

Furthermore, as described below, the system 100 includes a live NLP processor 116, which may be associated with a particular maximum turnaround time (TaT). The "processing time" of the live NLP processor 116 is the difference between the time at which the live NLP processor 116 begins processing data from the live data source 104 and the time at which the live NLP processor 116 produces output based on that data. The live NLP processor 116's maximum TaT is the maximum processing time of the live NLP processor 116. In other words, the processing time of the live NLP processor 116 is guaranteed to be no greater than the live NLP processor 116's maximum TaT.

The processing time of the long-term NLP services 110 may be longer than the live NLP processor 116's maximum turnaround time, possibly substantially longer (e.g., 2, 5, 10, 50, 100, or 1000 times longer than the maximum TaT). The processing time of the long-term NLP services 110 may be longer than the live NLP processor 116's processing time in connection with any particular set of input data, possibly substantially longer (e.g., 2, 5, 10, 50, 100, or 1000 times longer than the live NLP processor's processing time). The live NLP services 110 may receive the batch data sources 108a-n all at once or in multiple portions over any period of time. The long-term NLP services 110 may, for example, pull some or all of the batch data sources 108a-n by making one or more requests for data to the batch data sources 108a-n and receiving portions of the batch data sources 108a-n in response to each such request.

The system 100 also includes a batch natural language processing (NLP) processor 112. The batch NLP processor 112 performs NLP automatically (i.e., without human intervention) on the normalized batch data produced by the long-term NLP services 110 to produce batch NLP data (FIG. 2A, operation 204). As with the long-term NLP services 110, the batch NLP processor 112 may receive and process the normalized batch data over a period of time that is longer than the live NLP processor 116's maximum turnaround time, possibly substantially longer (e.g., 2, 5, 10, 50, 100, or 1000 times longer than the maximum TaT).

The batch NLP processor 112 may collect the normalized batch data in an asynchronous queue and process the normalized batch data using one or more business process rules to determine and apply a particular order and priority to the data within the normalized batch data. Because the batch NLP processor 112 is not limited by the live NLP processor 116's maximum TaT to produce the batch NLP data, the batch NLP processor 112 may perform more detailed reasoning on the normalized batch data than the live NLP processor would be capable of performing within the required maximum TaT.

The batch NLP processor 112 may perform one or more types of reasoning on different portions of the normalized batch data, depending on the nature of those portions of data. For example, certain types of reasoning may not be necessary to perform on certain types of data within the normalized batch data. As just one example, the batch NLP processor 112 may perform one type of reasoning on portions of the normalized batch data that were received from a word processor application and perform a different type of reasoning on portions of the normalized batch data that were received from a spreadsheet or calendar application. As another example, the batch NLP processor 112 may perform one type of reasoning on a document having content related to one medical specialty and perform another type of reasoning on a document having content related to a different medical specialty.

The batch NLP processor 112 may perform its processing in one or more phases, where each phase may require a different amount of time to complete. For example, the batch NLP processor 112 may perform a first phase of relatively simple processing on the normalized batch data, following by one or more additional phases of more complex processing on the data resulting from previous phases. The NLP processing performed by the batch NLP processor 112 may include any one or more types of NLP processing in any combination, each of which may be fully automated, human generated, or a combination thereof.

The long-term NLP services 110 generate the summarized NLP data model 114 based on the output of the batch NLP processor 112 (FIG. 2A, operation 206). The summarized NLP data model 114 may, for example, include some or all of the output of the batch NLP processor 112. The data in the summarized NLP data model 114 may be stored in a form that is easily compatible with both further processing by the batch NLP processor 112 and the live NLP processor 116. The summarized data model 114 may differ from the kind of predefined database or data source that can be queried by real-time NLP processing. As merely some examples, the summarized data model 114 may include more detailed information about a patient than is contained in a patient's EMR (e.g., a more specific diagnosis), or the summarized data model 114 may include evidence of a diagnosis in a case in which the patient's EMR does not indicate that diagnosis.

An actor 118 a session with the live NLP processor 116 and submits data from a live data source 104 (e.g., a computer) to the live NLP processor 116 (FIG. 2A, operation 208). This session initiated with the live NLP processor 116 is an interactive session requiring a short TaT (e.g., 1, 2, or 5 seconds). The live data source 104 may transmit data to the live NLP processor 116 directly (e.g., via API call). As another example, the live NLP processor 116 may read data from the live data source 104 directly or indirectly via applications that are able to acquire and collect data that is being entered. The source acquisition of this data by the live data source 104 may involve customization depending on the source of the data.

The actor 118's session with the live NLP processor 116 may be initiated after the summarized NLP data model 114 has been created in the manner described above. The summarized NLP data model 114 may be updated subsequently by the batch natural language understanding module 112 using the techniques disclosed herein, but the session between the actor 118 and the live NLP processor 116 may be initiated after the long-term NLP services 110 have had sufficient time to generate at least an initial (but not necessarily complete) version of the summarized NLP model 114. As this implies, the amount of time that passes between when the long-term NLP services 110 begins to process the batch data source 106 and the time when the actor 118 initiates the session with the live NLP processor 116 may be longer, potentially substantially longer (e.g., 2, 4, 10, 50, 100, or 1000 times longer), than the required maximum TaT and/or the actual processing time of the live NLP processor 116.

The live NLP processor 116 reads relevant portions of the summarized NLP data model 114 based on the live data received in operation 208 (FIG. 2A, operation 210). The live NLP processor 116 may identify portions of the summarized NLP data model 114 as relevant in any of a variety of ways. For example, if the live NLP processor 116 is processing a document within a particular specialty (e.g., cardiology), then the live NLP processor 116 may read portions of the summarized NLP data model 114 that are related to cardiology and not other portions of the summarized NLP data model 114. For the sake of efficiency, the live NLP processor 116 may, for example, only read such data from the summarized NLP data model 114 once at the beginning of the session since such data is unlikely to change within the short required TaT of the live NLP processor 116. In other embodiments, however, the live NLP processor 116 may read from the summarized NLP data model 114 more than once during the session. Furthermore, if an error occurs or the session requires re-creation, the live NLP processor 116 may read the summarized NLP data model 114 again.

The live NLP processor 116 combines the data from the live data source 104 with the data received from the summarized NLP data model 114 and performs NLP on the resulting combined data (FIG. 2A, operation 212). The live NLP processor 116 may perform operation 212 repeatedly; as the live NLP processor 116 receives new live data from the live data source 104, the live NLP processor 116 may combine that data with the data received from the summarized NLP data model 114 and performs NLP on the resulting combined data continuously, as more live data is received from the live data source 104. The live NLP processor 116 may update the data it receives from the summarized NLP data model 114 as it receives new live data from the live data source 104 to obtain data from the summarized NLP data model 114 that is relevant to the newly-received live data. Each time the live NLP processor 116 performs NLP on the resulting combined data, the live NLP processor 116 generates and outputs live NLP output to the actor 118. The live NLP processor 116 generates each such output within an amount of time that is no greater than the maximum TaT associated with the live NLP processor 116. For example, when the live NLP processor 116 receives a new unit of data from the live data source 104 at a particular time t, the live NLP processor 116 combines that unit of data with data received from the summarized NLP data model to produce combined data and performs NLP on the combined data to produce NLP output at a time t+T, where T is no greater than the live NLP processor 116's maximum TaT.

Figure 2B:
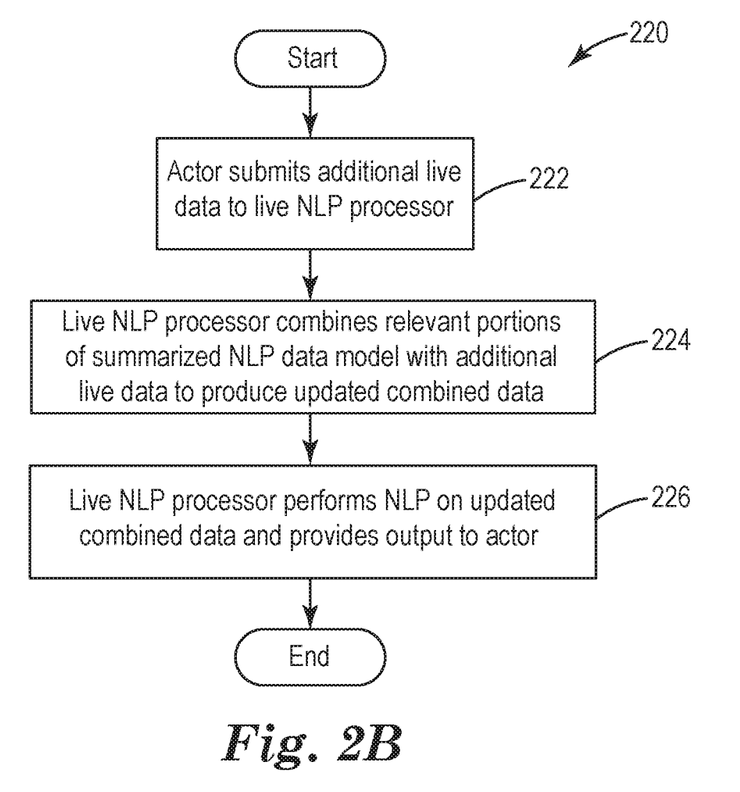
FIG. 2B is a flowchart of a method performed by the system of FIG. 1 to perform repeated NLP on additional live data according to one embodiment of the present invention.

For example, as shown in the method 220 of FIG. 2B, which may be performed after the method 200 of FIG. 2A, the actor 118 may submit second (i.e., additional) live data from the live data source 104 to the live NLP processor 116 (FIG. 2B, operation 222). The actor 118 may submit the second live data after the actor 118 submitted the initial data (e.g., operation 222 may be performed after operation 208). The live NLP processor 116 reads portions of the summarized NLP data model 114 that are relevant to the second live data received in operation 222 (FIG. 2B, operation 224). Operation 224 may be performed in any of the ways disclosed herein in connection with operation 210 in FIG. 2A. The live NLP processor 116 combines read portions of the summarized NLP data model 114 with the second live data, and performs NLP on the resulting updated combined data (FIG. 2B, operation 226). The live NLP processor 116 may perform operation 226 in any of the ways disclosed herein in connection with operation 212 in FIG. 2A.

Figure 2C:
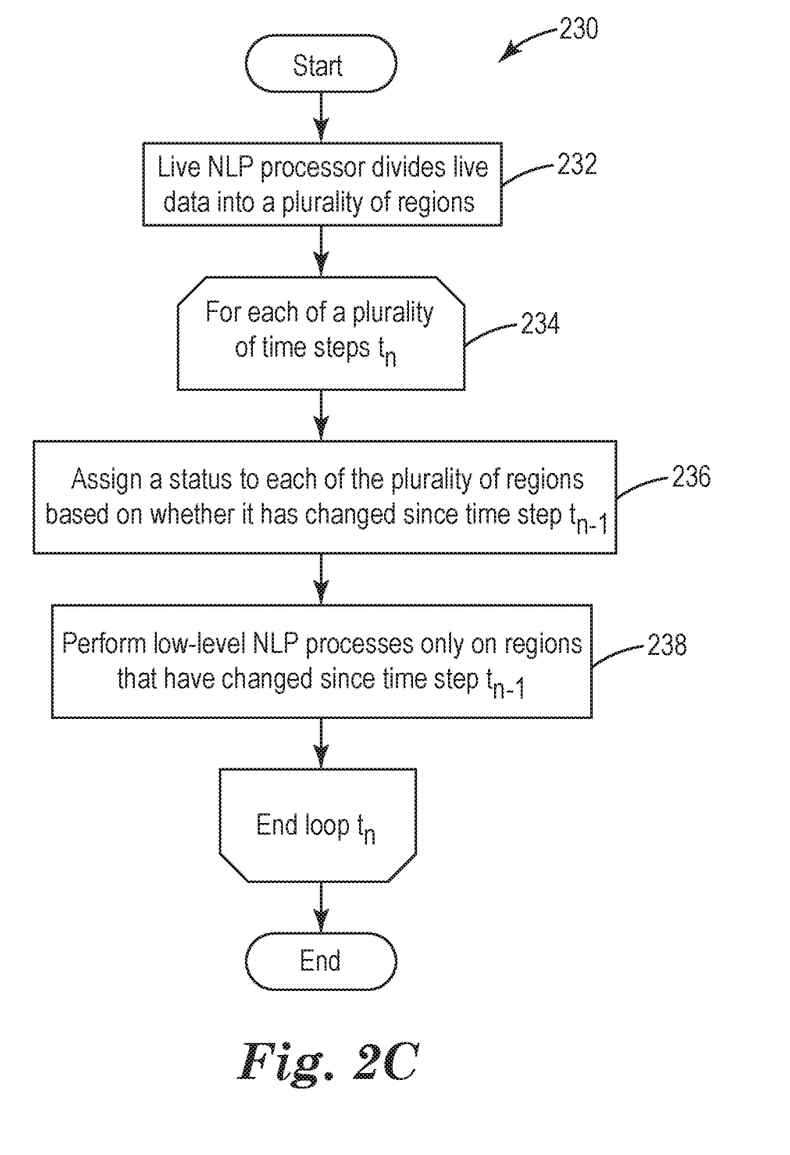
FIG. 2C is a flowchart of a method performed by the system of FIG. 1 to perform certain operations of embodiments of the present invention more efficiently.

As illustrated by the method 230 of FIG. 2C, in order to further speed up the processing performed by the live NLP processor 116, the live NLP processor 116 may divide the data received from the live data source 104 into a plurality of regions (FIG. 2C, operation 232). At each of a plurality of time steps $t_n$ (FIG. 2C, operation 234), the live NLP processor 116 assigns a status to each of the regions in the input received from the live data source 104, where the status indicates whether that region has changed since time step $t_{n-1}$ (FIG. 2C, operation 236). The NLP processes performed by the live NLP processor 116 are sensitive to this status and are only invoked by the live NLP processor 116 if necessary. For example, if a particular region has not changed since time t−1, then the live NLP processor 116 may not perform certain low-level NLP processes, such as tokenization or certain Named Entity Recognition processes, on that particular region (FIG. 2C, operation 238). Instead, cached previous results of such low-level NLP processes may be passed to NLP processes that require the entire input scope, such as any document-scoped reasoning, for regions that have not changed since time step $t_{n-1}$. This division into stateful regions and into differently-scoped NLP processes may be used to significantly speed up the processing performed by the live NLP processor 116. The method 230 of FIG. 2C may, for example, be used to implement some or all of operation 212 in the method 200 of FIG. 2A.

The live NLP processor 116 may also provide data received from the live data source 104 to the long-term NLP services 110, which may perform any of the long-term NLP processes described herein on the data received from the live data source, and use the results of that processing to update the summarized NLP data model 114.

One advantage of embodiments of the present invention is that they enable the benefits of long-term NLP processing to be obtained by actors within the relatively short TaTs required by various applications. Embodiments of the present invention may be used to enable NLP to be effectively performed in real-time even when the size, complexity, and distribution of the data required by the NLP would otherwise make it impossible to perform NLP in real-time. As a result, the quality of the NLP output is not compromised even when real-time or other short-TaT NLP is required.

As described above, a first aspect of the present invention are directed to a method performed by at least one computer processor executing computer program instructions stored on at least one non-transitory computer readable medium to execute a method. The method includes: (A) receiving batch data asynchronously from a first data source; (B) performing NLP on the batch data to produce batch NLP data; (C) at a batch NLP module, generating a summarized NLP data model based on the batch NLP data in a first amount of time; (D) at a live NLP processor, after (B): (D)(1) receiving first live data from a live data source; (D)(2) combining at least a first part of the summarized NLP data model with the first live data to produce first combined data; and (D)(3) performing live NLP on the first combined data to produce first live NLP output in a second amount of time, wherein the second amount of time is shorter than the first amount of time. A second aspect of the present invention is directed to a system which includes at least one non-transitory computer-readable medium containing computer program code that is executable by at least one computer processor to perform the method of the first aspect.

The method and/or system above may be combined with any one or more of the following features, in any combination. The second amount of time may be at least ten times shorter than the first amount of time, or at least one hundred times shorter than the first amount of time. Operation (D)(2) may include identifying portions of the summarized NLP data model that are relevant to the live data, and combining the identified portions of the summarized NLP data model with the live data. Operation (D)(3) may be performed in less than 5 seconds, or in less than 1 second. The live data may include data representing human speech, and the live NLP output may include text representing the human speech. The live data may include data representing human speech, and the live NLP output may include structured data including text representing the human speech and data representing concepts corresponding to the human speech. Operation (D)(3) may include performing live NLP on a first portion of the first live data in the first combined data at a first time, and performing live NLP again on the first portion of the first live data in the first combined data at a second time in response to determining that the first live data have changed since the first time.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, embodiments of the present invention use the live NLP processor 116 to perform natural language processing on disparate data sources in real-time or substantially in real-time, including performing such processing on combined data from a live data source and data from a summarized NLP data model produced by a batch NLP process. These are functions which are inherently computer-implemented and which could not be performed manually or mentally by a human.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

The invention claimed is:

1. A method performed by at least one computer processor executing computer program instructions stored on at least one non-transitory computer readable medium to execute a method, the method comprising:
   performing a batch NLP process that operates asynchronously, wherein the batch NLP process includes:
      receiving batch data asynchronously from a plurality of narrative and non-narrative data sources, wherein data in at least one of the data sources in the plurality is in a different data format than data in the other of the data sources in the plurality;
      normalizing the batch data to produce normalized batch data;
      performing NLP on the normalized batch data to produce batch NLP data;
      at a batch NLP module, generating a summarized NLP data model based on the batch NLP data in a first amount of time;
   at a live NLP processor, after performing NLP on the batch data:
      receiving first live data from a live data source;
      combining at least a first part of the summarized NLP data model with the first live data to produce first combined data; and
      performing live NLP on the first combined data to produce first live NLP output in a second amount of time,
   wherein the second amount of time is shorter than the first amount of time.

2. The method of claim 1, wherein the second amount of time is at least ten times shorter than the first amount of time.

3. The method of claim 1, wherein the second amount of time is at least one hundred times shorter than the first amount of time.

4. The method of claim 1, wherein the combining comprises identifying portions of the summarized NLP data model that are relevant to the live data, and combining the identified portions of the summarized NLP data model with the live data.

5. The method of claim 1, wherein performing live NLP on the first combined data is performed in less than 5 seconds.

6. The method of claim 1, wherein performing live NLP on the first combined data is performed in less than 1 second.

7. The method of claim 1, wherein the live data includes data representing human speech, and wherein the live NLP output comprises text representing the human speech.

8. The method of claim 1, wherein the live data includes data representing human speech, and wherein the live NLP output comprises structured data including text representing the human speech and data representing concepts corresponding to the human speech.

9. The method of claim 1, further comprising, at the live NLP processor, after performing NLP on the batch data:
   receiving second live data from the live data source;
   combining at least a second part of the summarized NLP data model with the second live data to produce second combined data; and
   performing live NLP on the second combined data to produce second live NLP output in a third amount of time,
   wherein the third amount of time is shorter than the first amount of time.

10. The method of claim 1, wherein performing NLP on the first combined data comprises performing live NLP on a first portion of the first live data in the first combined data at a first time, and performing live NLP again on the first portion of the first live data in the first combined data at a second time in response to determining that the first live data have changed since the first time.

11. A system comprising at least one non-transitory computer-readable medium having computer program instructions stored thereon, the computer program instructions being executable by at least one computer processor to execute a method, the method comprising:
   performing a batch NLP process that operates asynchronously, wherein the batch NLP process includes:
      receiving batch data asynchronously from a plurality of narrative and non-narrative data sources, wherein data in at least one of the data sources in the plurality is in a different data format than data in the other of the data sources in the plurality;
      normalizing the batch data to produce normalized batch data;
      performing NLP on the normalized batch data to produce batch NLP data;
      at a batch NLP module, generating a summarized NLP data model based on the batch NLP data in a first amount of time;
   at a live NLP processor, after performing NLP on the batch data:
      receiving first live data from a live data source;
      combining at least a first part of the summarized NLP data model with the first live data to produce first combined data; and
      performing live NLP on the first combined data to produce first live NLP output in a second amount of time,
   wherein the second amount of time is shorter than the first amount of time.

12. The system of claim 11, wherein the second amount of time is at least ten times shorter than the first amount of time.

13. The system of claim 11, wherein the second amount of time is at least one hundred times shorter than the first amount of time.

14. The system of claim 11, wherein the combining comprises identifying portions of the summarized NLP data model that are relevant to the live data, and combining the identified portions of the summarized NLP data model with the live data.

15. The system of claim 11, wherein performing live NLP on the first combined data is performed in less than 5 seconds.

16. The system of claim 11, wherein performing live NLP on the first combined data is performed in less than 1 second.

17. The system of claim 11, wherein the live data includes data representing human speech, and wherein the live NLP output comprises text representing the human speech.

18. The system of claim 11, wherein the live data includes data representing human speech, and wherein the live NLP output comprises structured data including text representing the human speech and data representing concepts corresponding to the human speech.

19. The system of claim 11, wherein the method further comprises, at the live NLP processor, after performing NLP on the batch data:
   receiving second live data from the live data source;
   combining at least a second part of the summarized NLP data model with the second live data to produce second combined data; and
   performing live NLP on the second combined data to produce second live NLP output in a third amount of time,
   wherein the third amount of time is shorter than the first amount of time.

20. The system of claim 11, wherein performing NLP on the first combined data comprises performing live NLP on a first portion of the first live data in the first combined data at a first time, and performing live NLP again on the first portion of the first live data in the first combined data at a second time in response to determining that the first live data have changed since the first time.

* * * * *